United States Patent [19]

Hirano

[11] Patent Number: 4,514,049
[45] Date of Patent: Apr. 30, 1985

[54] ZOOM LENS SYSTEM FOR FINITE CONJUGATE DISTANCES

[75] Inventor: Nagayoshi Hirano, Ohmiya, Japan

[73] Assignee: Fuji Photo Optical Co., Ltd., Ohmiya, Japan

[21] Appl. No.: 513,684

[22] Filed: Jul. 14, 1983

[30] Foreign Application Priority Data

Sep. 30, 1982 [JP] Japan .................... 57-172095

[51] Int. Cl.³ ............... G02B 15/16; G02B 17/00
[52] U.S. Cl. .................... 350/425; 350/446
[58] Field of Search .......... 350/425, 423, 446

[56] References Cited

U.S. PATENT DOCUMENTS 4,037,937 7/1977 Minoura .................. 350/425
4,149,774 4/1979 Hirano et al. ............ 350/425

Primary Examiner—John K. Corbin
Assistant Examiner—Scott J. Sugarman
Attorney, Agent, or Firm—Pasquale A. Razzano

[57] ABSTRACT

A zoom lens system for use as a copying lens, for example, comprises first to sixth elements arranged in this order from front to rear with a stop disposed between the third and fourth elements. The first element is a positive lens convex to the front and the second element is a negative lens concave to the front. The first and second elements together form a first stationary lens group having negative power. The third element is a positive lens and forms a first movable lens. The sixth, fifth and fourth elements are reverse duplicates of the first, second and third elements. The fourth element forms a second movable lens, and the fifth and sixth elements together form a second stationary lens group. The lens system is axially movable as a unit between fixed image and object planes. The first and second movable lenses are axially movable in response to the axial movement of the entire lens system to vary the magnification of the image. The following three conditions are satisfied.

$$0.4 < fV/f_{1.0} < 0.61 \quad (1)$$

$$-0.55 < fV/r_5 = fV/-r_9 < 0.3 \quad (2)$$

$$0.72 < d_9/d_4 < 0.39 \quad (3)$$

wherein fV represents the focal length of the movable lenses, $f_{1.0}$ represents the focal length of the entire lens system when it is adjusted for unit magnification, $r_5$ and $r_9$ respectively represent the radii of curvature of the surfaces of the movable lenses facing the stationary lens groups, $d_4$ represents the axial space between the first stationary lens group and the first movable lens, and $d_9$ represents the axial space between the second stationary lens group and the second movable lens.

2 Claims, 16 Drawing Figures

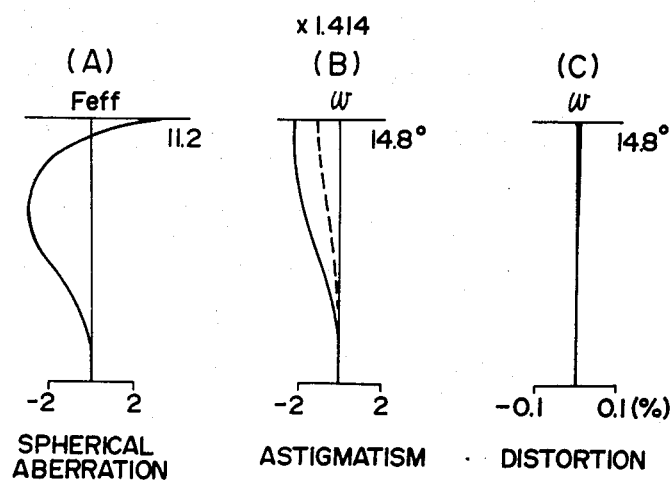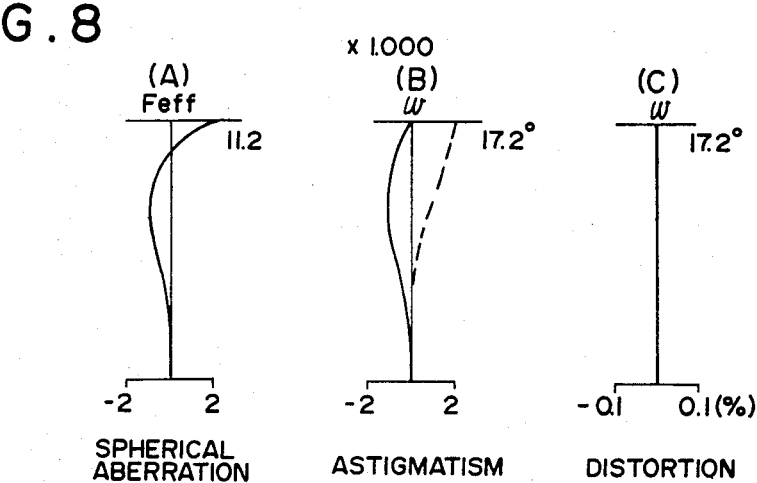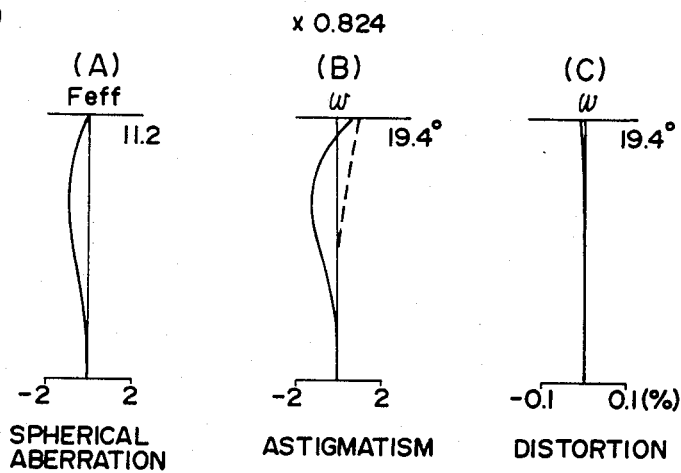

× 0.615

(A) Spherical Aberration — Feff 11.2, range −2 to 2
(B) Astigmatism — ω 17.5°, range −2 to 2
(C) Distortion — ω 17.5°, range −0.1 to 0.1(%)

×0.824

×0.615

ZOOM LENS SYSTEM FOR FINITE CONJUGATE DISTANCES

BACKGROUND OF THE INVENTION

1. Field of the Invention

This invention relates to a continuously variable power lens system for use as a copying lens, a photoengraving lens, a relay lens in an optical system, or the like which is generally used at magnifications of the image near unit magnification and whose power can be varied with the finite conjugate distance fixed.

2. Description of the Prior Art

Recently, there is an increased demand for a copying system or a photoengraving system in which the magnification or reduction ratio of the image can be continuously varied. In conventional systems of this type the magnification or the reduction ratio of the image can be varied only to a plurality of discrete values.

As is well known, in order to vary the magnification (In this specification, the term "magnification" should be broadly interpreted to include magnification not larger than unit magnification.) using a fixed focal length lens system, at least two of the object plane, the image plane and the lens system must be moved. However, it is undesirable to move the surface of the object plane or the image plane from the viewpoint of operational convenience and because a complicated link mechanism is required. Therefore, the magnification has generally been varied without moving either the object plane or the image plane by inserting a plurality of mirrors into the object space between the object plane and the lens system or the image space between the image plane and the lens system and moving the mirrors to compensate for change of the conjugate distance. However, this method is disadvantageous in continuously varying the magnification since an expensive servomechanism is required to relate the movement of the mirrors with the magnification, and because a mirror transfer mechanism becomes necessary for moving the mirrors, which are relatively large, whereby the overall size of the system is significantly enlarged.

The magnification can also be varied without moving either the object plane or the image plane by changing the focal length by moving only the lens system and adding an attachment lens. However, by this method, there can only be obtained a magnification which is determined by the characteristics of the main lens system and the attachment lens added, and the magnification cannot be continuously varied.

On the other hand, attempts have been made to develop a zoom lens system whose magnification is continuously variable without changing the conjugate distance by moving the whole lens system and some of its lens elements. (See Japanese Unexamined Patent Publication No. 56(1981)-159614, and Japanese Unexamined Patent Publication No. 57(1982)-67909, for example.) Either of the zoom lens systems is deemed to comprise an ortho-metha-type main lens system and an attachment lens system disposed in front and the rear of the main lens system. The zoom lens system disclosed in the first-mentioned Japanese Unexamined Patent Publication is of the outer element movable type, and the main lens system is stationary while the attachment lens system is movable. On the other hand, the zoom lens system disclosed in the latter Japanese Unexamined Patent Publication is of the inner element movable type, and the main lens system is movable while the attachment lens system is stationary. In both zoom lens systems, the power of the attachment lens system is negative, and both systems consists of four groups, the powers of which are negative, positive, positive and negative, respectively. It is well known that the zoom lens system can be miniaturized by the negative-positive-positive-negative arrangement. However, the size of the obtained zoom lens system and the amount of movement of the movable lens groups depend upon distribution of the powers of the negative and positive lens groups.

In either of the zoom lens systems disclosed in the above identified Japanese Unexamined Patent Publications, if the power of the negative lens groups is too large, the performance of the positive lens groups is adversely affected, since the negative lens groups function like an attachment lens. Therefore, the power of the negative lens groups must be small in the zoom lens systems, which inherently results in a large amount of movement of the movable lens groups. This, in addition to the increased number of lenses, prevents the zoom lens systems disclosed in the above Japanese Unexamined Patent Publications from adequately meeting the demand for a compact zoom lens system. Further, zoom lens systems like that disclosed in the Japanese Unexamined Patent Publication No. 56(1981)-159614, in which the outer lens groups are movable to change the length of the overall lens system and the amount of movement of the movable lens groups is large, are disadvantageous in that greater mechanical limitation must be imposed to prevent interference of the movable lens groups with other parts in the system in which the zoom lens system is employed.

Use of the zoom lens is advantageous, on the one hand, in that the mechanism for changing the magnification of the image is highly simplified, but is disadvantageous, on the other hand, in that the conjugate distance must be long, the field angle must be small in order to obtain performance equivalent to that of fixed focal length lens systems, and the number of lenses is increased, whereby it becomes difficult to apply the zoom lens to inexpensive copying systems and the like.

Generally, in a variable focal length lens system whose focal length is varied without changing the conjugate distance, the entire lens system and two of the lens groups constituting it must be moved.

In photographic zoom lens systems which are designed to operate at front focal distances near theoretical infinity, the image plane can be maintained at a fixed position by changing the position of the principal point without moving the entire lens system. However, in a copying lens, for example, which is used at magnifications near 1x and in which the conjugate distance is finite, the conjugate distance varies by a large amount when the magnification changes and the object plane and the image plane are fixed at a constant position mostly by changing the magnification through movement of the entire lens system and partly by changing the magnification by slightly changing the focal length through axial movement of some of the elements.

In copying systems and photoengraving systems, in which the magnification is generally varied within a range including unit magnification (1x), it is advantageous, from the viewpoint of the distortion, the chromatic aberration of magnification, coma and the like, to arrange the lenses in a symmetrical manner and to change the magnification by moving the movable lenses without breaking the symmetry. That is, it is preferable to move the movable groups disposed on opposite sides of the stop in a symmetrical manner maintaining the symmetry in response to the movement of the entire lens system so that the symmetry in the entire lens system is not significantly broken and the conjugate distance can remain constant.

SUMMARY OF THE INVENTION

In view of the foregoing observations and description, the primary object of the present invention is to provide a miniaturized finite conjugate zoom lens system having excellent performance which is very simple in structure and is inexpensive.

DESCRIPTION OF THE PREFERRED EMBODIMENTS

Figure 1:
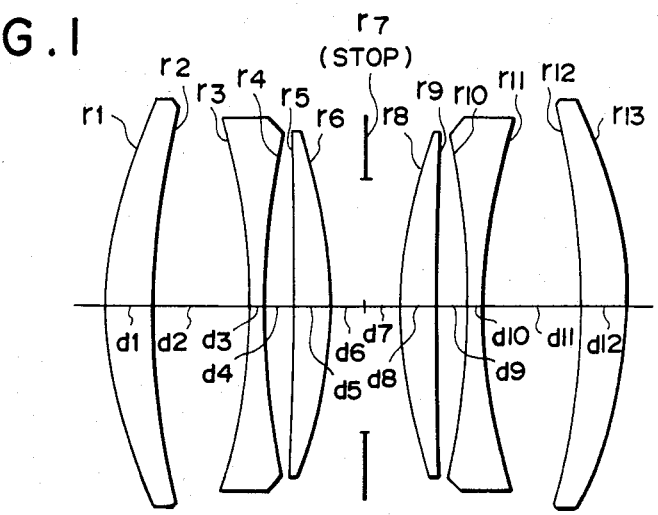
FIG. 1 is a sectional view showing the arrangement of elements of a zoom lens system in accordance with a first embodiment of the present invention with the system being adjusted for unit magnification, FIGS. 2 to 5 respectively show aberration curves for the spherical aberrations, astigmatism and distortion at magnifications of 1.414x, 1.000x, 0.824x and 0.615x in the first embodiment.
Figure 2:
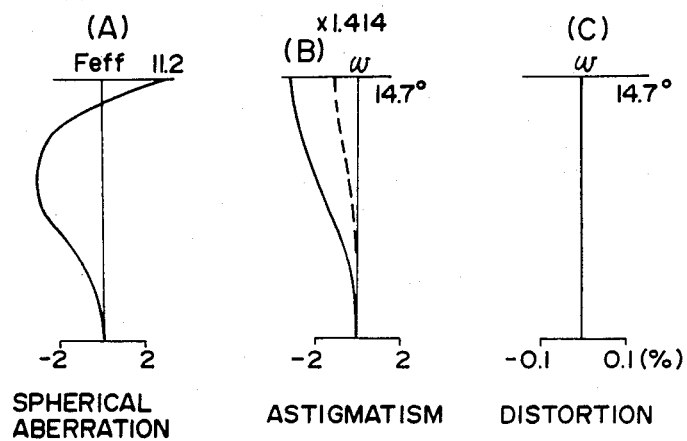
Figure 3:
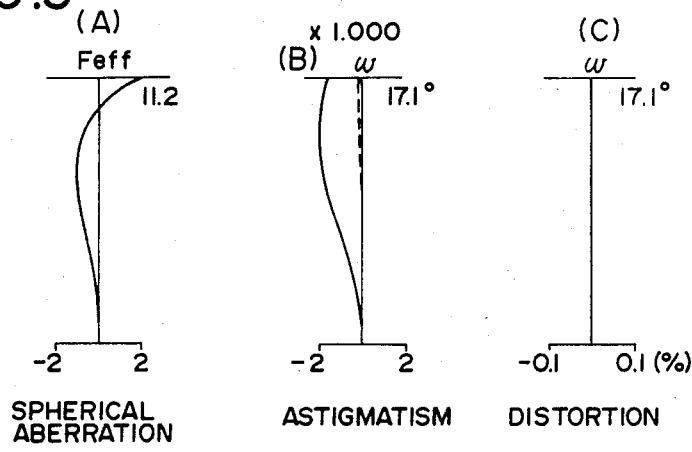
Figure 4:
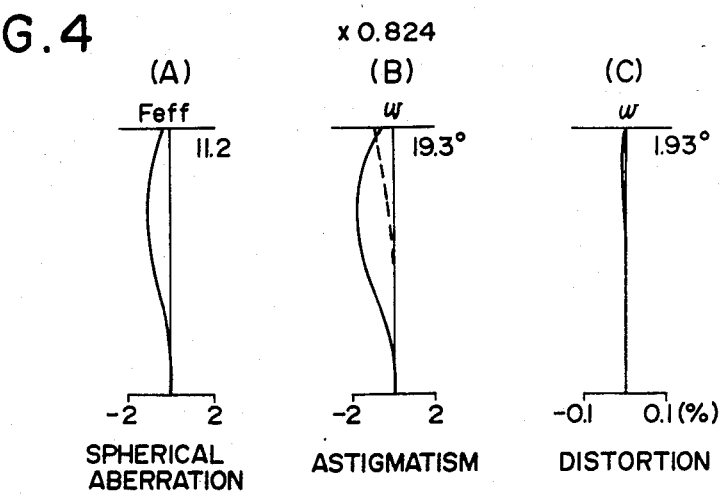
Figure 5:
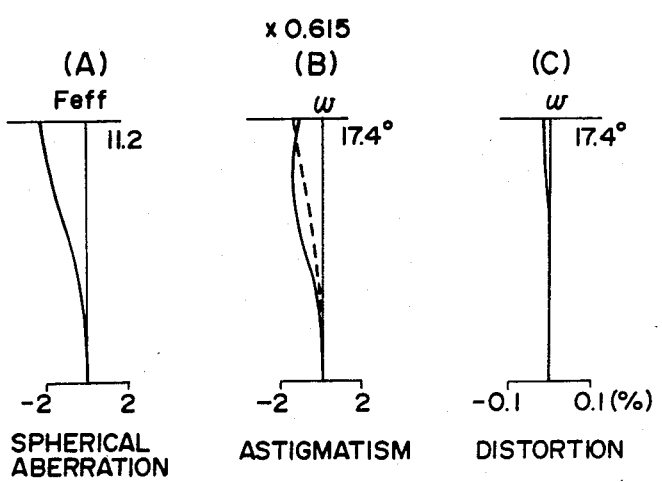

The zoom lens system of the present invention comprises first to sixth elements arranged in this order from front to rear. The first element is a positive lens convex to the front and the second element is a negative lens concave to the front. The first and second elements together form a first stationary lens group having negative power. The third element is a positive lens and forms a first movable lens. The sixth, fifth and fourth elements are reverse duplicates of the first, second and third elements. The fourth element forms a second movable lens and the fifth and sixth elements together form a second stationary lens group. The first to third elements are opposed to the fourth to sixth elements with a stop disposed between the third and fourth elements. The terms "front" and "rear" are herein used, in accordance with the usual convention to relate to the sides of the objective respectively nearer to and further from the longer conjugate. The zoom lens system of the present invention satisfies the following three conditions.

$$0.4 < fV/f_{1.0} < 0.61 \quad (1)$$

$$-0.55 < fV/r_5 = fV/-r_9 < 0.3 \quad (2)$$

$$0.72 < \bar{d}_9/\bar{d}_4 < 1.39 \quad (3)$$

wherein fV represents the focal length of the movable lenses, $f_{1.0}$ represents the focal length of the entire lens system when it is adjusted for unit magnification, $r_5$ and $r_9$ respectively represent the radii of curvature of the surfaces of the movable lenses facing the stationary lens groups, $\bar{d}_4$ represents the axial space between the first stationary lens group and the first movable lens, and $\bar{d}_9$ represents the axial space between the second stationary lens group and the second movable lens. In the zoom lens system of the present invention, the magnification of the image can be varied without changing the conjugate distance (object plane to image plane) by axially moving the entire lens system and moving the first and second movable lenses in response to the movement of the entire lens system.

In the conventional variable power lens system for the same application, the aberrations of the stationary group and the movable group are corrected independently from each other, and therefore, the number of lenses is inherently increased whereby the overall size of the system becomes large.

On the other hand, in the lens system of the present invention, each of the front side half and the rear side half which are opposed to each other with the stop therebetween comprises a triplet type system having a positive-negative-positive power arrangement in which the spherical aberration, the image surface characteristics and the chromatic aberration can be attended to with a minimal number of lenses. This makes it easy to obtain an excellent performance of the entire lens system as a whole including the movable and stationary lens groups. Further by adding the conditions 1, 2 and 3 defined above, the overall size of the entire lens system can be made compact. For example, the overall length of the lens system is not longer than $0.4 \times f_{1.0}$, wherein $f_{1.0}$ represents the focal length at unit magnification. At the same time, excellent correction of aberrations can be obtained over the entire range of variation in magnification of the image.

Conditions 1 and 2 are satisfied by the movable groups. Since the lens system of the present invention consists of six elements and each movable group consists of a single positive lens, the performance of the entire lens system depends mainly upon the power distribution among the individual lens groups. Particularly, the power of the movable lens and the distribution of the power between the front and rear surfaces of each movable lens are important in order to make the overall size of the entire lens system compact and to restrict variation in the aberrations in changing the magnification of the image.

Satisfying condition 1 helps to make the entire lens system compact. As the value of $fV/f_{1.0}$ approaches the lower limit, the entire lens system can be made smaller in size. However, when the value of $fV/f_{1.0}$ becomes equal to or smaller than the lower limit, fluctuation of the image plane becomes too large to realize a lens system which has a wide field angle and provides a wide range of variation in magnification of the image. On the other hand, when the value of $fV/f_{1.0}$ becomes equal to or larger than the upper limit, the amount of movement of the movable lenses becomes large and at the same time the power of the stationary lens groups becomes small, and therefore, the overall size of the lens system cannot be made sufficiently small. When the movable lenses satisfy condition 1, the lens system can provide a range of variation of magnification from 1.0x to 0.615x without moving the movable lenses by a distance longer than 1% of the focal length of the lens system when it is adjusted for unit magnification. Further, since each movable lens consists of a single positive lens disposed inside the system, the magnification of the image can be changed by only moving a pair of very light weight lenses by a very small distance. Accordingly, the mechanism for moving the movable lenses can be highly simplified and can be made light in weight. Further, the deterioration of performance which is apt to occur in variable magnification lens systems due to tilt of the movable lenses can be avoided.

Condition 2 relates to the fluctuation of the image plane, coma and flare. As the value of $fV/r_5$ approaches the lower limit, the fluctuation of the image plane becomes smaller. However, if the value of $fV/r_5$ becomes equal to or smaller than the lower limit, the effect of the concave surfaces on the upper and lower light bundles becomes strong to give rise to coma and flare. Though this can be restricted to some extent by increasing the refractive indices of the movable lenses, there is a limitation and it is not preferable. On the other hand when the value of $fV/r_5$ becomes equal to or larger than the upper limit, the fluctuation of the image plane becomes too large to realize a lens system having a large field angle.

The reason for satisfying condition 3 is to control the image plane over the entire range of variation of magnification of the image. In copying systems of photoengraving systems, the field angles generally differs with magnification. This is because the magnification of the image and the field angle are determined according to the size of the image limited by the maximum original size when the size of the image is to be reduced, while they are determined according to the size of the original limited by the maximum image size when the image is to be enlarged.

In attempting to obtain a solution while maintaining the symmetry of the lens system, it may become impossible, depending upon the condition of use, to obtain a solution which is excellent over the entire range of variation of magnification of the image due to variation in the image surface characteristics with the field angles which differ with magnifications of the image. Though this can be avoided by arranging the lens elements in an asymmetric manner, this is undesirable in that it makes it impossible to enjoy the advantages of low manufacturing cost obtained by arranging the elements in an symmetric manner. Thus, in accordance with the present invention, the image plane at each magnification is controlled without changing the axial performance by moving the movable lenses in an asymmetric manner with respect to the stop. The condition 3 relates to the asymmetric movement of the movable lenses.

When the movable lenses are arranged in an asymmetric manner so that the value of $\bar{d}_9/\bar{d}_4$ approaches the lower limit, the image plane in an excessively under the condition on the reduction side of the magnification is corrected toward an over condition, while the image plane in an excessively over condition on the enlarging side of the magnification is corrected toward an under condition. When the value of $\bar{d}_9/\bar{d}_4$ becomes equal to or smaller than the lower limit, the negative distortion on both the reduction side and the enlarging side of the magnification becomes to large for a lens system to be applied to copying systems or photoengraving systems. On the other hand, when the movable lenses are arranged in an asymmetric manner so that the value of $\bar{d}_9/\bar{d}_4$ approaches the upper limit, the image plane in an excessively over condition on the reduction side of the magnification is corrected toward an under condition, while the image plane in an excessively under condition the enlarging side of the magnification is corrected toward an over condition. When the value of $\bar{d}_9/\bar{d}_4$ becomes equal to or larger than the upper limit, the positive distortion becomes too large to permit application of the lens system to copying systems or photoengraving systems.

Figure 16:
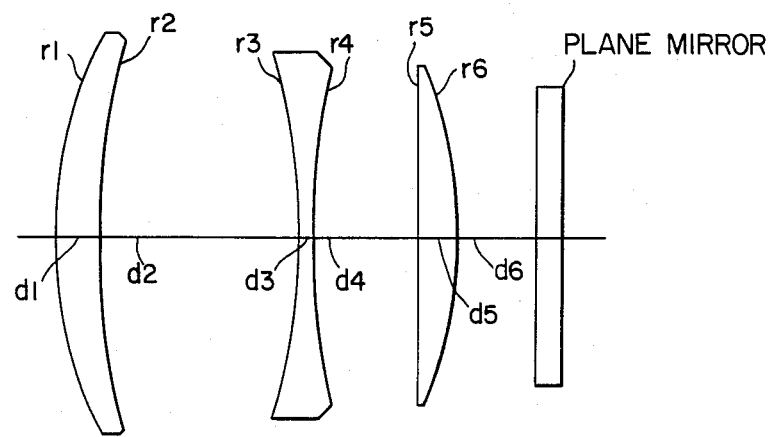
FIG. 16 is a sectional view similar to FIG. 1 showing another embodiment of the invention.

When the value of $\bar{d}_9/\bar{d}_4$ is fixed at 1.0 over the entire range of variation of magnification of the image, the lens system of the present invention becomes of the complete symmetric type. In this case the lens system can be used as a variable magnification optical system in the form of a reflector lense, as shown in FIG. 16 in which the surface of the stop is used as the reflecting surface and the light bundle passes through the first stationary lens group and the first movable lens back and forth.

Though the inner element movable type embodiment of the present invention has been described, a substantially equivalent performance can be obtained by an outer element movable type embodiment of the present invention in which the third and fourth elements are stationary and the first and second elements and the fifth and sixth elements are movable, insofar as the basic arrangement of the power is the same. The present invention also includes such an outer element movable type lens system.

As can be seen from the description above, there can be provided in accordance with the present invention an excellent and miniaturized variable magnification optical system without lowering basic specifications such as the numerical aperture, the field angle, the variable range of magnification and the like, using a minimal number of lenses.

Now several embodiments of the present invention will be described referring to the drawings. In each embodiment, r, d, N and ν, respectively designate the radii of curvature of the refracting surfaces, the axial air separations or thickness of lenses, the refractive indices for the sodium d-line and the Abbe dispersion numbers numbered by subscripts in order from front to rear.

FIG. 1 shows the arrangement of elements of a zoom lens system in accordance with a first embodiment of the present invention with the system being adjusted for unit magnification. The zoom lens system of this embodiment is constructed in conformity with the following table. FIGS. 2 to 5 respectively show aberration curves for the spherical aberrations, astigmatism and distortion at magnifications of 1.414x, 1.000x, 0.824x and 0.615x in the first embodiment.

First embodiment:

| Effective FNO = 11.2 (Feff) | | Focal length = 324–344 | |
|---|---|---|---|
| Magnification = −0.615 — 1.414 | | | |
| $r_1 = 105.528$ | $d_1 = 10.705$ | $N_1 = 1.60311$ | $\nu_1 = 60.7$ |
| $r_2 = 166.711$ | $d_2 = 22.780$ | | |
| $r_3 = -140.256$ | $d_3 = 3.461$ | $N_2 = 1.60342$ | $\nu_2 = 38.0$ |
| $r_4 = 214.249$ | $d_4 = 7.000$ | | |
| $r_5 = -843.000$ | $d_5 = 8.200$ | $N_3 = 1.78500$ | $\nu_3 = 43.7$ |
| $r_6 = -114.097$ | $d_6 = 8.250$ | | |
| $r_7 = \infty$ (stop) | $d_7 = 8.250$ | | |
| $r_8 = 114.097$ | $d_8 = 8.200$ | $N_4 = 1.78500$ | $\nu_4 = 43.7$ |
| $r_9 = 843.000$ | $d_9 = 7.000$ | | |
| $r_{10} = -214.249$ | $d_{10} = 3.461$ | $N_5 = 1.60342$ | $\nu_5 = 38.0$ |

-continued

First embodiment:

| $r_{11} = 140.256$ | $d_{11} = 22.780$ | | |
|---|---|---|---|
| $r_{12} = -166.711$ | $d_{12} = 10.705$ | $N_6 = 1.60311$ | $\nu_6 = 60.7$ |
| $r_{13} = -105.528$ | | | |

| | | | | |
|---|---|---|---|---|
| Magnification | −1.414 | −1.000 | −0.824 | −0.615 |
| Focal length | 333.88 | 344.06 | 340.83 | 324.41 |
| Half field angle (w) | 14.7° | 17.1° | 19.3° | 17.4° |
| $d_4$ | 8.339 | 7.000 | 7.418 | 9.643 |
| $d_6$ | 6.911 | 8.250 | 7.832 | 5.607 |
| $d_7$ | 6.911 | 8.250 | 7.832 | 5.607 |
| $d_9$ | 8.339 | 7.000 | 7.418 | 9.643 |
| condition 3 $d_9/d_4$ | 1.0 | 1.0 | 1.0 | 1.0 |
| condition 1: | $fV/f_{1.0} = 0.486$ | | | |
| condition 2: | $fV/r_5 = fV/-r_9 = -0.198$ | | | |

Figure 6:
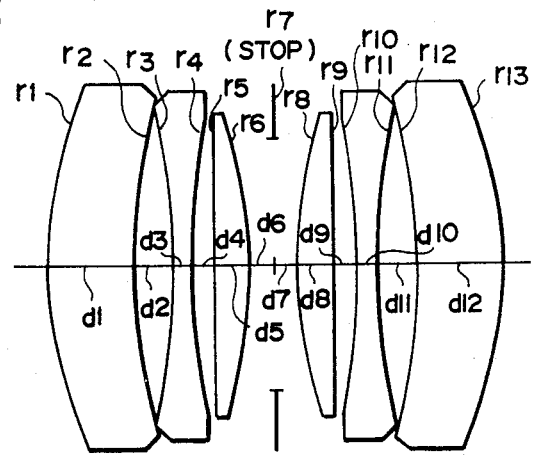
FIG. 6 is a sectional view showing the arrangement of elements of a zoom lens system in accordance with a second embodiment of the present invention with the system being adjusted for unit magnification, FIGS. 7 to 10 respectively show aberration curves for the spherical aberrations, astigmatism and distortion at magnifications of 1.414x, 1.000x, 0.824x and 0.615x in the second embodiment.
Figure 10:
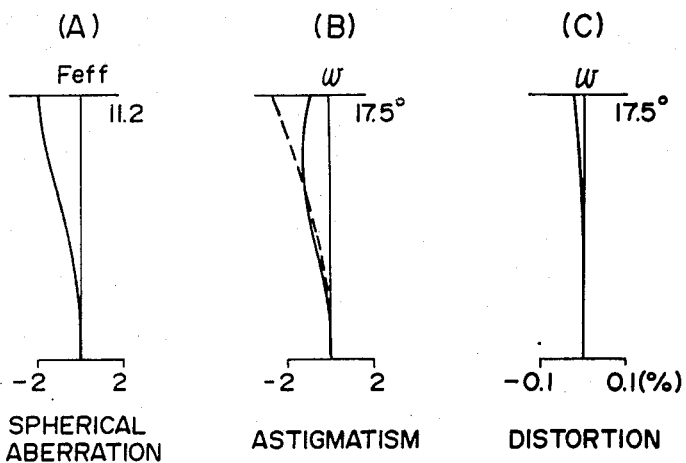

FIG. 6 shows the arrangement of elements of a zoom lens system in accordance with a second embodiment of the present invention with the system being adjusted for unit magnification. The zoom lens system of this embodiment is constructed in conformity with the following table. FIGS. 7 to 10 respectively show aberration curves for the spherical aberrations, astigmatism and distortion at magnifications of 1.414x, 1.000x, 0.824x and 0.615x in the second embodiment.

Second embodiment:

| Effective FNO = 11.2 (Feff) | | Focal length = 323–342 | |
|---|---|---|---|
| Magnification = −1.414 − −0.615 | | | |
| $r_1 = 99.693$ | $d_1 = 19.440$ | $N_1 = 1.65844$ | $\nu_1 = 50.8$ |
| $r_2 = 139.426$ | $d_2 = 9.871$ | | |
| $r_3 = -147.267$ | $d_3 = 4.366$ | $N_2 = 1.61659$ | $\nu_2 = 36.6$ |
| $r_4 = 185.729$ | $d_4 = 5.190$ | | |
| $r_5 = -7207.246$ | $d_5 = 7.563$ | $N_3 = 1.74400$ | $\nu_3 = 44.9$ |
| $r_6 = -114.174$ | $d_6 = 6.055$ | | |
| $r_7 = \infty$ (stop) | $d_7 = 6.055$ | | |
| $r_8 = 114.174$ | $d_8 = 7.563$ | $N_4 = 1.74400$ | $\nu_4 = 44.9$ |
| $r_9 = 7207.246$ | $d_9 = 5.190$ | | |
| $r_{10} = -185.729$ | $d_{10} = 4.366$ | $N_5 = 1.61659$ | $\nu_5 = 36.6$ |
| $r_{11} = 147.267$ | $d_{11} = 9.871$ | | |
| $r_{12} = -139.426$ | $d_{12} = 19.440$ | $N_6 = 1.65844$ | $\nu_6 = 50.8$ |
| $r_{13} = -99.693$ | | | |

| | | | | |
|---|---|---|---|---|
| Magnification | −1.414 | −1.000 | −0.824 | −0.615 |
| Focal length | 332.02 | 342.13 | 338.93 | 322.61 |
| Half field angle (w) | 14.8° | 17.2° | 19.4° | 17.5° |
| $d_4$ | 6.402 | 5.190 | 5.568 | 7.582 |
| $d_6$ | 4.843 | 6.055 | 5.677 | 3.663 |
| $d_7$ | 4.843 | 6.055 | 5.677 | 3.663 |
| $d_9$ | 6.402 | 5.190 | 5.568 | 7.582 |
| condition 3 $d_9/d_4$ | 1.0 | 1.0 | 1.0 | 1.0 |
| condition 1: | $fV/f_{1.0} = 0.456$ | | | |
| condition 2: | $fV/r_5 = fV/-r_9 = -0.022$ | | | |

Figure 11:
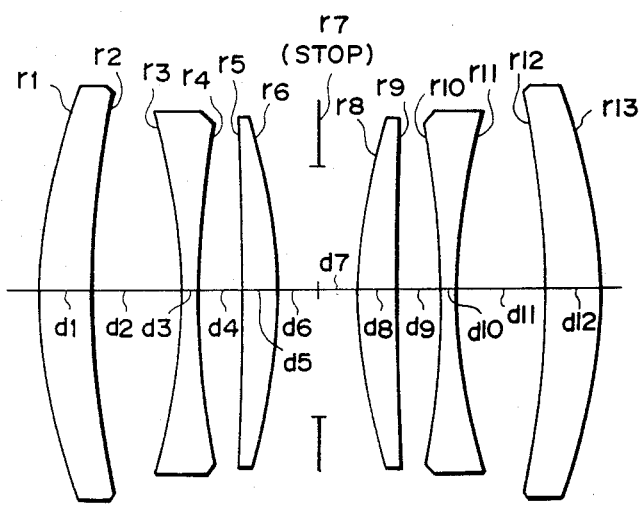
FIG. 11 is a sectional view showing the arrangement of elements of a zoom lens system in accordance with a third embodiment of the present invention with the system being adjusted for unit magnification, FIGS. 12 to 15 respectively show aberration curves for the spherical aberrations, astigmatism and distortion at magnifications of 1.414x, 1.000x, 0.824x and 0.615x in the third embodiment.
Figure 12:
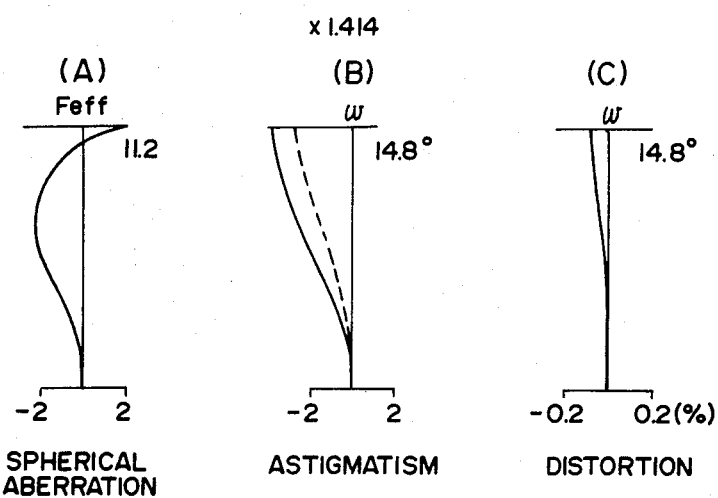
Figure 13:
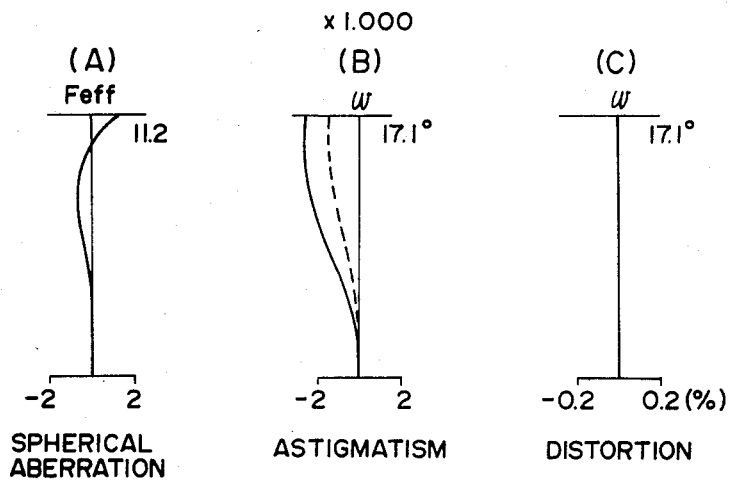
Figure 14:
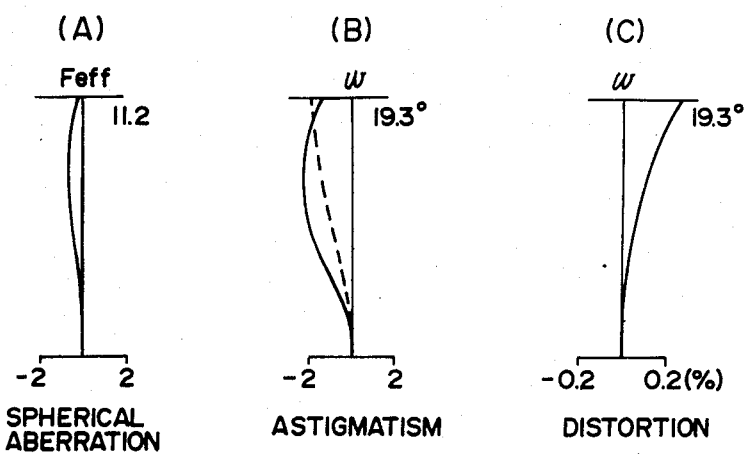
Figure 15:
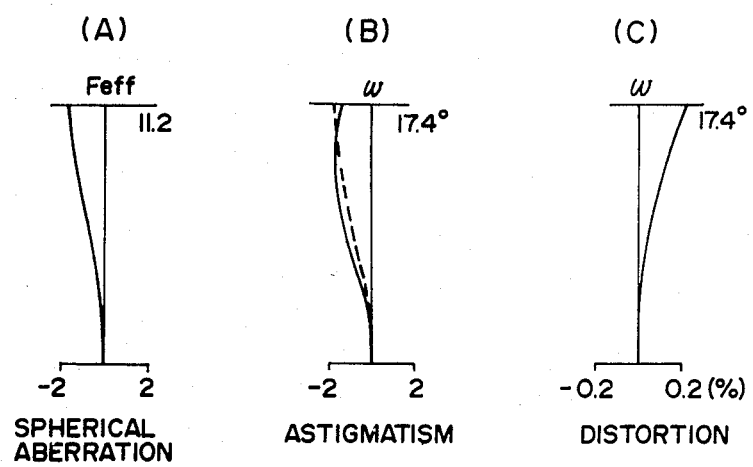

FIG. 11 shows the arrangement of elements of a zoom lens system in accordance with a third embodiment of the present invention with the system being adjusted for unit magnification. The zoom lens system of this embodiment is constructed in conformity with the following table. FIGS. 12 to 15 respectively show aberration curves for the spherical aberrations, astigmatism and distortion at magnifications of 1.414x, 1.000x, 0.824x and 0.615x in the third embodiment.

Third embodiment:

| Effective FNO = 11.2 (Feff) | Focal length = 324–344 |
|---|---|
| Magnification = −1.414 − −0.615 | |

-continued

Third embodiment:

| $r_1 = 119.353$ | $d_1 = 12.713$ | $N_1 = 1.60311$ | $\nu_1 = 60.7$ |
|---|---|---|---|
| $r_2 = 215.135$ | $d_2 = 20.758$ | | |
| $r_3 = -153.704$ | $d_3 = 4.111$ | $N_2 = 1.60342$ | $\nu_2 = 38.0$ |
| $r_4 = 232.473$ | $d_4 = 10.380$ | | |
| $r_5 = -627.611$ | $d_5 = 8.200$ | $N_3 = 1.81550$ | $\nu_3 = 44.4$ |
| $r_6 = -125.154$ | $d_6 = 9.515$ | | |
| $r_7 = \infty$ (stop) | $d_7 = 9.515$ | | |
| $r_8 = 125.154$ | $d_8 = 8.200$ | $N_4 = 1.81550$ | $\nu_4 = 44.4$ |
| $r_9 = 627.611$ | $d_9 = 10.380$ | | |
| $r_{10} = -232.473$ | $d_{10} = 4.111$ | $N_5 = 1.60342$ | $\nu_5 = 38.0$ |
| $r_{11} = 153.704$ | $d_{11} = 20.758$ | | |
| $r_{12} = -215.135$ | $d_{12} = 12.713$ | $N_6 = 1.60311$ | $\nu_6 = 60.7$ |
| $r_{13} = -119.353$ | | | |

| | | | | |
|---|---|---|---|---|
| Magnification | −1.414 | −1.000 | −0.824 | −0.615 |
| Focal length | 333.49 | 343.67 | 340.44 | 324.02 |
| Half field angle (w) | 14.8° | 17.1° | 19.3° | 17.4° |
| $d_4$ | 12.794 | 10.380 | 9.879 | 12.702 |
| $d_6$ | 7.101 | 9.515 | 10.016 | 7.193 |
| $d_7$ | 8.481 | 9.515 | 7.932 | 5.040 |
| $d_9$ | 11.414 | 10.380 | 11.963 | 14.855 |
| condition 3 $d_9/d_4$ | 0.892 | 1.0 | 1.211 | 1.170 |
| condition 1: | $fV/f_{1.0} = 0.554$ | | | |
| condition 2: | $fV/r_5 = fV/-r_9 = -0.303$ | | | |

The following tables respectively show zoom lens systems in accordance with fourth to sixth embodiments of the present invention.

Fourth embodiment:

| Effective FNO = 11.2 (Feff) | | Focal length = 322–342 | |
|---|---|---|---|
| Magnification = −1.414 − −0.615 | | | |
| $r_1 = 115.134$ | $d_1 = 22.723$ | $N_1 = 1.65844$ | $\nu_1 = 50.8$ |
| $r_2 = 184.173$ | $d_2 = 11.427$ | | |
| $r_3 = -147.958$ | $d_3 = 5.054$ | $N_2 = 1.61659$ | $\nu_2 = 36.6$ |
| $r_4 = 213.061$ | $d_4 = 6.920$ | | |
| $r_5 = -1191.611$ | $d_5 = 8.650$ | $N_3 = 1.74400$ | $\nu_3 = 44.9$ |
| $r_6 = -116.524$ | $d_6 = 10.380$ | | |
| $r_7 = \infty$ (stop) | $d_7 = 10.380$ | | |
| $r_8 = 116.524$ | $d_8 = 8.650$ | $N_4 = 1.74400$ | $\nu_4 = 44.9$ |
| $r_9 = 1191.611$ | $d_9 = 6.920$ | | |
| $r_{10} = -213.061$ | $d_{10} = 5.054$ | $N_5 = 1.61659$ | $\nu_5 = 36.6$ |
| $r_{11} = 147.958$ | $d_{11} = 11.427$ | | |
| $r_{12} = -184.173$ | $d_{12} = 22.723$ | $N_6 = 1.65844$ | $\nu_6 = 50.8$ |
| $r_{13} = -115.134$ | | | |

| | | | | |
|---|---|---|---|---|
| Magnification | −1.414 | −1.000 | −0.824 | −0.615 |
| Focal length | 331.93 | 342.08 | 338.87 | 322.49 |
| Half field angle (w) | 14.8° | 17.2° | 19.4° | 17.5° |
| $d_4$ | 8.437 | 6.920 | 7.393 | 9.911 |
| $d_6$ | 8.863 | 10.380 | 9.907 | 7.389 |
| $d_7$ | 8.863 | 10.380 | 9.907 | 7.389 |
| $d_9$ | 8.437 | 6.920 | 7.393 | 9.911 |
| condition 3 $d_9/d_4$ | 1.0 | 1.0 | 1.0 | 1.0 |
| condition 1: | $fV/f_{1.0} = 0.506$ | | | |
| condition 2: | $fV/r_5 = fV/-r_9 = -0.145$ | | | |

Fifth embodiment:

| Effective FNO = 11.2 (Feff) | | Focal length = 323–342 | |
|---|---|---|---|
| Magnification = −1.000 − −0.615 | | | |
| $r_1 = 92.764$ | $d_1 = 18.821$ | $N_1 = 1.65844$ | $\nu_1 = 50.8$ |
| $r_2 = 124.102$ | $d_2 = 9.556$ | | |
| $r_3 = -154.438$ | $d_3 = 4.227$ | $N_2 = 1.61659$ | $\nu_2 = 36.6$ |
| $r_4 = 168.128$ | $d_4 = 5.190$ | | |
| $r_5 = 3460.000$ | $d_5 = 8.650$ | $N_3 = 1.74400$ | $\nu_3 = 44.9$ |
| $r_6 = -116.975$ | $d_6 = 6.055$ | | |
| $r_7 = \infty$ (stop) | $d_7 = 6.055$ | | |
| $r_8 = 116.975$ | $d_8 = 8.650$ | $N_4 = 1.74400$ | $\nu_4 = 44.9$ |
| $r_9 = -3460.000$ | $d_9 = 5.190$ | | |

-continued

Fifth embodiment:

| | | | |
|---|---|---|---|
| $r_{10} = -168.128$ | $\bar{d}_{10} = 4.227$ | $N_5 = 1.61659$ | $\nu_5 = 36.6$ |
| $r_{11} = 154.438$ | $d_{11} = 9.556$ | | |
| $r_{12} = -124.102$ | $d_{12} = 18.821$ | $N_6 = 1.65844$ | $\nu_6 = 50.8$ |
| $r_{13} = -92.764$ | | | |

| | | | |
|---|---|---|---|
| Magnification | $-1.000$ | $-0.824$ | $-0.615$ |
| Focal length | 342.12 | 338.91 | 322.59 |
| Half Field angle (w) | 17.2° | 19.4° | 17.5° |
| $\bar{d}_4$ | 5.190 | 5.550 | 7.472 |
| $\bar{d}_6$ | 6.055 | 5.695 | 3.773 |
| $\bar{d}_7$ | 6.055 | 5.695 | 3.773 |
| $\bar{d}_9$ | 5.190 | 5.550 | 7.472 |
| condition 3 $\bar{d}_9/\bar{d}_4$ | 1.0 | 1.0 | 1.0 |
| condition 1: | $fV/f_{1.0} = 0.445$ | | |
| condition 2: | $fV/r_5 = fV/-r_9 = 0.044$ | | |

Sixth embodiment:

Effective FNO = 11.2 (Feff)   Focal length = 324–344
Magnification = $-1.414$ – $-0.615$

| | | | |
|---|---|---|---|
| $r_1 = 115.270$ | $\bar{d}_1 = 10.908$ | $N_1 = 1.60311$ | $\nu_1 = 60.7$ |
| $r_2 = 190.225$ | $d_2 = 23.213$ | | |
| $r_3 = -140.585$ | $d_3 = 3.527$ | $N_2 = 1.61659$ | $\nu_2 = 36.6$ |
| $r_4 = 241.266$ | $\bar{d}_4 = 10.380$ | | |
| $r_5 = -908.396$ | $\bar{d}_5 = 7.771$ | $N_3 = 1.78500$ | $\nu_3 = 43.7$ |
| $r_6 = -118.585$ | $\bar{d}_6 = 8.250$ | | |
| $r_7 = \infty$ (stop) | $\bar{d}_7 = 8.250$ | | |
| $r_8 = 118.585$ | $\bar{d}_8 = 7.771$ | $N_4 = 1.78500$ | $\nu_4 = 43.7$ |
| $r_9 = 908.396$ | $\bar{d}_9 = 10.380$ | | |
| $r_{10} = -241.266$ | $d_{10} = 3.527$ | $N_5 = 1.61659$ | $\nu_5 = 36.6$ |
| $r_{11} = 140.585$ | $d_{11} = 23.213$ | | |
| $r_{12} = -190.225$ | $d_{12} = 10.908$ | $N_6 = 1.60311$ | $\nu_6 = 60.7$ |
| $r_{13} = -115.270$ | | | |

| | | | | |
|---|---|---|---|---|
| Magnification | $-1.414$ | $-1.000$ | $-0.824$ | $-0.615$ |
| Focal length | 333.77 | 343.94 | 340.71 | 324.29 |
| Half field angle (w) | 14.8° | 17.1° | 19.4° | 17.5° |
| $\bar{d}_4$ | 12.114 | 10.380 | 11.678 | 14.503 |
| $\bar{d}_6$ | 6.516 | 8.250 | 6.952 | 4.127 |
| $\bar{d}_7$ | 7.207 | 8.250 | 8.676 | 6.880 |
| $\bar{d}_9$ | 11.423 | 10.380 | 9.954 | 11.750 |
| condition 3 $\bar{d}_9/\bar{d}_4$ | 0.943 | 1.0 | 0.852 | 0.810 |
| condition 1: | $fV/f_{1.0} = 0.503$ | | | |
| condition 2: | $fV/r_5 = fV/-r_9 = -0.190$ | | | |

I claim:

1. A zoom lens system for finite conjugate distances comprising first to sixth elements arranged in this order from front to rear with a stop disposed between the third and fourth elements, the first element being a positive lens convex to the front, the second element being a negative lens concave to the front, the first and second elements together forming a first stationary lens group having negative power, the third element being a positive lens forming a first movable lens, the sixth, fifth and fourth elements being reverse duplicates of the first, second and third elements, the fourth element forming a second movable lens, the fifth and sixth elements together forming a second stationary lens group, said zoom lens system being axially movable as a unit, and the first and second movable lenses being axially movable in response to the axial movement of the entire lens system to vary the magnification of the image without changing the distance between the object plane and the image plane, wherein the following conditions are satisfied, $$0.4 < fV/f_{1.0} < 0.61$$

$$-0.55 < fV/r_5 = fV/-r_9 < 0.3$$

$$0.72 < \bar{d}_9/\bar{d}_4 < 1.39$$

wherein fV represents the focal length of the movable lenses, $f_{1.0}$ represents the focal length of the entire lens system when it is adjusted for unit magnification, $r_5$ and $r_9$ respectively represent the radii of curvature of the surfaces of the movable lenses facing the stationary lens groups, $\bar{d}_9$ represents the axial space between the first stationary lens group and the first movable lens, and $\bar{d}_4$ represents the axial space between the second stationary lens group and the second movable lens.

2. A variable magnification reflector lens system for finite conjugate distances comprising first to third lens elements and a plane mirror arranged in this order from front to rear, the first element being a positive lens convex to the front, the second element being a negative lens concave to the front, the first and second elements together forming a stationary lens group having negative power, the third element being a positive lens forming a movable lens, said zoom lens system being axially movable as a unit, and the movable lens being axially movable in response to the axial movement of the entire lens system to vary the magnification of the image without changing the distance between the object plane and the image plane, wherein the following conditions are satisfied, $$0.4 < fV/f_{1.0} < 0.61$$

$$-0.55 < fV/r_5 < 0.3$$

wherein fV represents the focal length of the movable lenses, $f_{1.0}$ represents the focal length of the entire lens system when it is adjusted for unit magnification, and $r_5$ represents the radius of curvature of the surface of the movable lens facing the stationary lens group.

* * * * *